United States Patent
Shintani (10) Patent No.: US 7,628,089 B2
(45) Date of Patent: Dec. 8, 2009

(54) TRANSMISSION

(75) Inventor: Masanori Shintani, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 71 days.

(21) Appl. No.: 12/051,243

(22) Filed: Mar. 19, 2008

(65) Prior Publication Data

US 2009/0038423 A1  Feb. 12, 2009

(30) Foreign Application Priority Data

Aug. 9, 2007  (JP) ............................. P2007-207917

(51) Int. Cl.
*F16H 59/00* (2006.01)
*B60K 20/00* (2006.01)

(52) U.S. Cl. .................... 74/335; 74/473.36; 74/900

(58) Field of Classification Search .................. 74/330, 74/331, 339, 340, 335, 900, 473.1, 473.21, 74/473.36, 473.37, 471 XY
See application file for complete search history.

(56) References Cited

U.S. PATENT DOCUMENTS

| | | | | |
|---|---|---|---|---|
| 5,408,898 | A * | 4/1995 | Steeby et al. | ............... 74/473.1 |
| 7,240,578 | B2 * | 7/2007 | Ogami et al. | ................. 74/340 |
| 7,467,563 | B2 * | 12/2008 | Drabek et al. | ................ 74/335 |
| 2008/0210034 | A1 * | 9/2008 | Murakami et al. | ............ 74/335 |
| 2008/0302199 | A1 * | 12/2008 | Shintani et al. | .......... 74/473.12 |
| 2008/0305928 | A1 * | 12/2008 | Shintani et al. | ............. 477/115 |

FOREIGN PATENT DOCUMENTS

| | | | |
|---|---|---|---|
| EP | 0149020 A2 * | 7/1985 | |
| EP | 1308651 | 5/2003 | |
| JP | 2001-304411 A | 10/2001 | |
| JP | 2005-532517 | 10/2005 | |
| JP | 2006506591 | 2/2006 | |
| JP | 2007522406 | 8/2007 | |

\* cited by examiner

*Primary Examiner*—Roger Pang
(74) *Attorney, Agent, or Firm*—Birch, Stewart, Kolasch & Birch, LLP (57) ABSTRACT

A transmission, includes: a shift member, adapted to be moved in a shifting direction and a selecting direction; a plurality of shift lugs, each of which has a pair of first claw portions spaced apart from each other in the shifting direction, and which are arranged in the selecting direction; and a plurality of shift forks, connected to the shift lugs via shift rails. On a predetermined shift lug of the plurality of the shift lugs, a second claw portion is provided in such a manner as to project from one of the first claw portions in the selecting direction so that, in a shifting position, the second claw portion accommodates a displacement of the shift member from the adjacent shift lug side in the selecting direction, and the second claw portion is brought into abutment with the shift member in association with the shift member being displacement from the displacement accommodated state in the shifting direction so as to cause the corresponding shift fork to move from the shifting position to a neutral position.

7 Claims, 8 Drawing Sheets

SHIFTING DIRECTION

FIG. 8

SHIFTING DIRECTION

TRANSMISSION

BACKGROUND OF THE INVENTION

The present invention relates to a mechanical transmission, and more particularly to the construction of a transmission unit of a transmission which includes dual clutches.

There are known mechanical automatic transmissions which use no torque converter, as transmissions for vehicles. In these mechanical automatic transmissions, operations (gear selection and shift) in a transmission of a manual transmission and engagement and disengagement of clutches are performed by an actuator, whereby automatic gear changes requiring no torque converters are enabled. The transmission includes a shift shaft which can be moved in a shifting direction and a selecting direction through sliding and rotating, a plurality of shift lugs (shift brackets) which are arranged in the selecting direction, and shift rails (rods) which connect the shift lugs and shift forks, respectively. Furthermore, a shift member (shifter), which is formed into a pawl shape, is provided on the shift shaft in such a manner as to project outwards, and a pair of claw portions is provided on each shift lug in such a manner as to be spaced apart from each other in the shifting direction. In addition, the shift shaft is moved by the actuator in the mechanical automatic transmission, whereby the claw portion of the shift lug is selectively pushed to be moved in the shifting direction by the shift member, so that the shift fork is operated to be moved selectively.

Furthermore, in the mechanical automatic transmissions, dual clutch type automatic transmissions having two clutches have been developed. In the dual clutch type automatic transmissions, from a state in which one gear is engaged via one of the clutches, a target gear is engaged via the other clutch, and when the rotational speed of the target gear comes to synchronize with that of the gear engaged via the one clutch, the one clutch is disengaged, whereby no neutral state takes place during the gearchange, and a gearchange is enabled in which there is virtually no interruption of power flow as the gearchange takes places.

In this way, in the dual clutch type automatic transmission, since shift operations for the two gears are performed sequentially during the gearchange, the movements of the shift member become complex, and as a result, there is caused a fear that the shifting time becomes long. To cope with this, there has been proposed a mechanical automatic transmission in which a space between a pair of claw portions provided on each shift lug is expanded in the shifting direction, so that a shift member can enter between the pair of claw portions on the shift lug for a target gear which is in a neutral position only by shifting the shift member from between the pair of claw portions of the shift lug which is in a shifted state in the selecting direction, the movements of the shift member being thereby simplified (refer to JP-A-2001-304411).

In JP-A-2001-304411, however, in order for the shift member to enter between the pair of claw portions when the shift member is moved to the selecting direction, the pair of claw portions must be disposed in such a manner that the space between the pair of claw portions is expanded relatively wide. Consequently, when a gear is engaged, since a distance over which the shift member is moved from its neutral position to the claw portion for abutment becomes relatively long, there is caused a fear that a quick shift is not attained.

Figure 8:
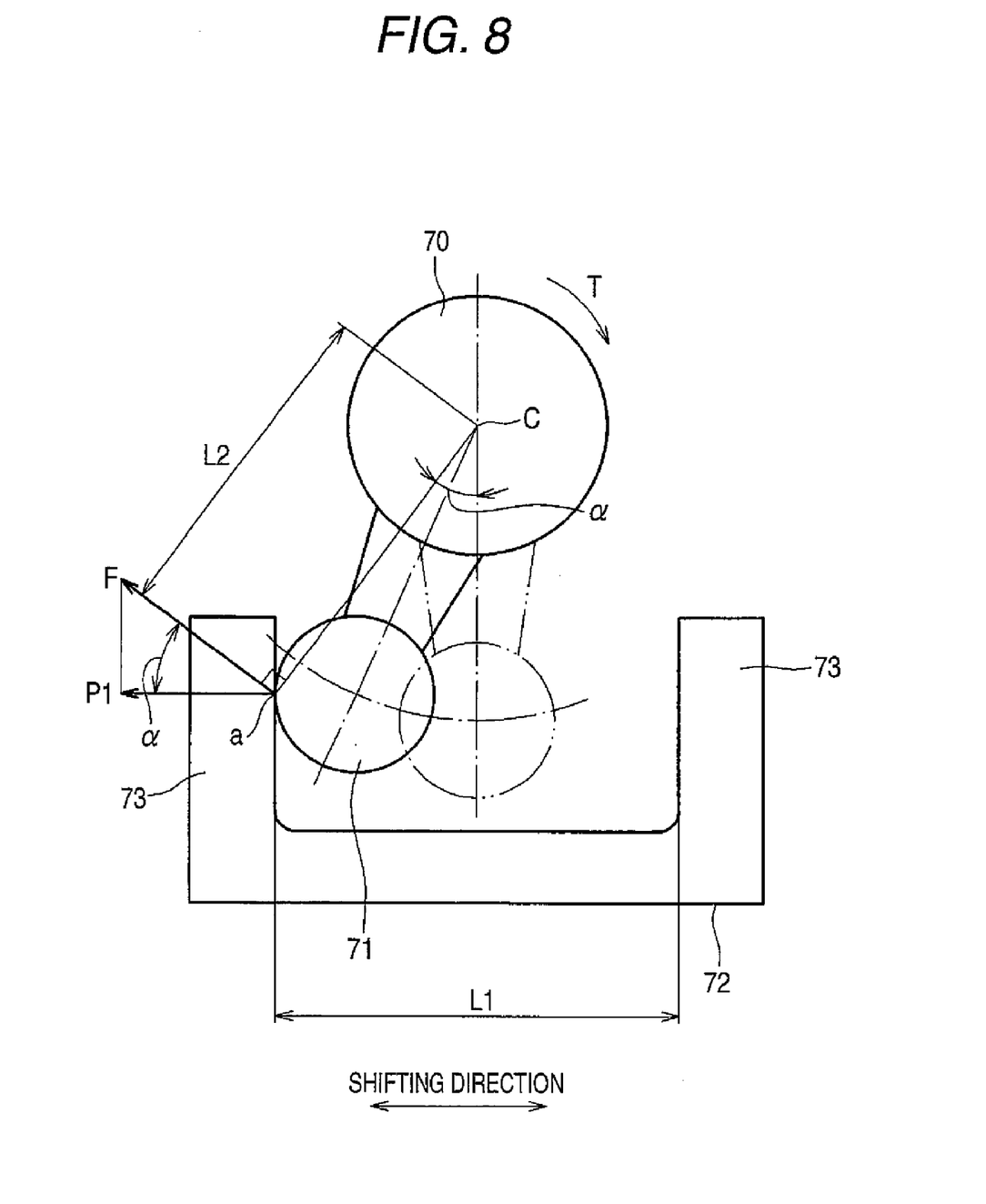
FIG. 8 is a schematic diagram showing the construction of a shifting mechanism of the shift lug according to the related art transmission.

In addition, in the event that the pair of claw portions are disposed in such a manner that the space therebetween is expanded relatively wide, force transmitted from the shift member to the claw portion becomes small, and the efficiency is deteriorated. Hereinafter, the reason for the deteriorated efficiency will be described using FIG. 8. FIG. 8 is a schematic diagram showing the construction of a shift mechanism of a shift lug according to the related art (JP-A-2001-304411).

As is shown in FIG. 8, in the mechanical automatic transmission described in JP-A-2001-304411, a construction is adopted in which a shift member 71 is caused to swing by rotation of a control shaft 70 so as to push a claw portion 73 of a shift lug 72 in a shifting direction. In the construction like this, when a space L1 between a pair of claw portions 73 is increased, the shift member 71 is caused to push the claw portion 73 while the shift member 71 is tilted largely towards the shifting direction. Assuming that a force exerted on the claw portion 73 by a rotational torque T of the control shaft 70 then is a tangential force F, a distance from a contact point a between the shift member 71 and the claw portion 73 to an axial center C of the control shaft 70 is a distance L2, and a tilt angle of a line which connects the contact point a with the axial center C towards the shifting direction is an angle α, a component of the tangential force F in the shifting direction, that is, a component force P1 which is a force which shifts the shift lug 72 in the shifting direction is obtained by the following equation (1).

$$P1 = F \times \cos \alpha = T \times \cos \alpha / L2 \qquad (1)$$

In the equation (1), in the event that the distance L2 is substantially constant irrespective of the angle α, it is found that when the angle α is increased within a range of 0 to 90 degrees, the component force P1 is decreased. Consequently, in the event that the space L1 between the pair of claw portions 73 is increased as in JP-A-2001-304411, the force pushing the claw portion 73 towards the shifting direction is decreased, and hence, it becomes difficult to move the shift lug 72 in the shifting direction with good efficiency.

SUMMARY

It is therefore an object of the invention to provide a transmission which enables quick and efficient gearchanges by simplifying the movements of the shift member without expanding largely the space between the pair of claw portions provided on the shift lug.

In order to achieve the object, according to the invention, there is provided a transmission, comprising:

a shift member, adapted to be moved in a shifting direction and a selecting direction;

a plurality of shift lugs, each of which has a pair of first claw portions spaced apart from each other in the shifting direction, and which are arranged in the selecting direction; and a plurality of shift forks, connected to the shift lugs via shift rails, wherein the shift member is moved by an actuator to push one of the first claw portions in the shifting direction to thereby selectively move the corresponding shift lug in the shifting direction so as to cause the corresponding shift fork to move from a neutral position to a shifting position, wherein on a predetermined shift lug of the plurality of the shift lugs, a second claw portion is provided in such a manner as to project from one of the first claw portions in the selecting direction so that, in the shifting position, the second claw portion accommodates a displacement of the shift member from the adjacent shift lug side in the selecting direction, and the second claw portion is brought into abutment with the shift member in association with the shift member being displacement from the displacement accommodated state in the shifting direction so as to cause the corresponding shift fork to move from the shifting position to the neutral position.

DETAILED DESCRIPTION OF PREFERRED EMBODIMENTS

Hereinafter, an embodiment of the invention will be described based on the accompanying drawings.

Figure 1:
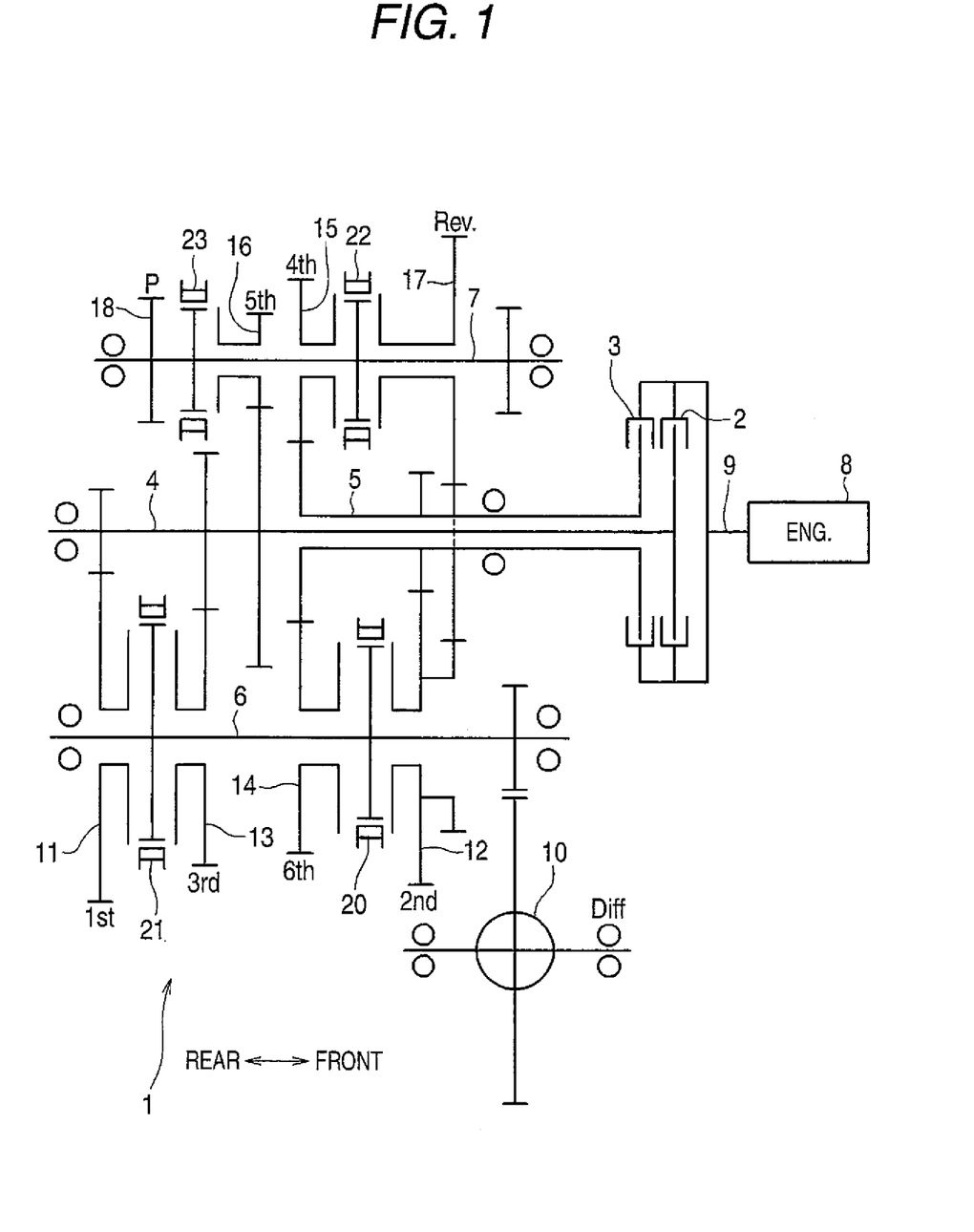
FIG. 1 is an exemplary diagram of a dual clutch type automatic transmission with six forward gears and one reverse gear to which the invention is applied.

FIG. 1 is an exemplary diagram of a transmission unit 1 of a dual clutch type transmission with six forward gears and one reverse gear to which the invention is applied.

As is shown in FIG. 1, the transmission unit 1 includes two clutches 2, 3, two main shafts 4, 5 which are disposed concentrically and two counter shafts 6, 7. Power is configured to be delivered to the first main shaft 4 from an output shaft 9 of an engine 8 via the first clutch 2, while the power is configured to be delivered to the second main shaft 5 from the output shaft 9 via the second clutch 3.

The first counter shaft 6 and the second counter shaft 7 are disposed spaced apart in such a manner that their axes become parallel to those of the first main shaft 4 and the second main shaft 5 and are configured to be able to deliver the power to a differential 10 which is disposed at a final stage of the transmission unit 1. A first speed gear 11, a second speed gear 12, a third speed gear 13 and a sixth speed gear 14 are pivotally supported on the first counter shaft 6 in such a manner as to rotate thereon. A fourth speed gear 15, a fifth speed gear 16 and a reverse gear 17 are pivotally supported on the second counter shaft 7 in such a manner as to rotate thereon, and a parking gear 18 is fixed to the second counter shaft 7.

In addition, four shift forks 20 to 23 are provided in the transmission unit 1. A first shift fork 20 and a second shift fork 21 are placed in such a manner as to slide to be moved along the axis of the first counter shaft 6, and a third shift fork 22 and a fourth shift fork 23 are placed in such a manner as to slide to be moved along the axis of the second counter shaft 7. By sliding to move these shift forks 20 to 23, the second speed gear 12 and the sixth speed gear 14 are allowed to selectively come in or out of engagement with the first counter shaft 6 (gearchange operations) by the first shift fork 20, and the first speed gear 11 and the third speed gear 13 are allowed to selectively come in or out of engagement with the first counter shaft 6 (gearchange operations) by the second shift fork 21. In addition, the fourth speed gear 15 and the reverse gear 17 are allowed to selectively come in or out of engagement with the second counter shaft 7 (gearchange operations) by the third shift fork 22, and the fifth speed gear 16 and the parking gear 18 are allowed to selectively come in or out of engagement with the second counter shaft 7 (gearchange operations) by the fourth shift fork 23. The first speed gear 11, the third speed gear 13 and the fifth speed gear 16 are connected to the first main shaft 4, while the second speed gear 12, the fourth speed gear 15, the sixth speed gear 14 and the reverse gear 17 are connected to the second main shaft 5.

Namely, in the transmission unit 1 of the dual clutch type transmission, gearchanges to/from the first speed gear, the third speed gear and the fifth speed gear can selectively be attained by way of the first clutch 2, while gearchanges to/from the second speed gear, the fourth speed gear, the sixth speed gear and the reverse gear can selectively be attained by way of the second clutch 3.

Figure 2:
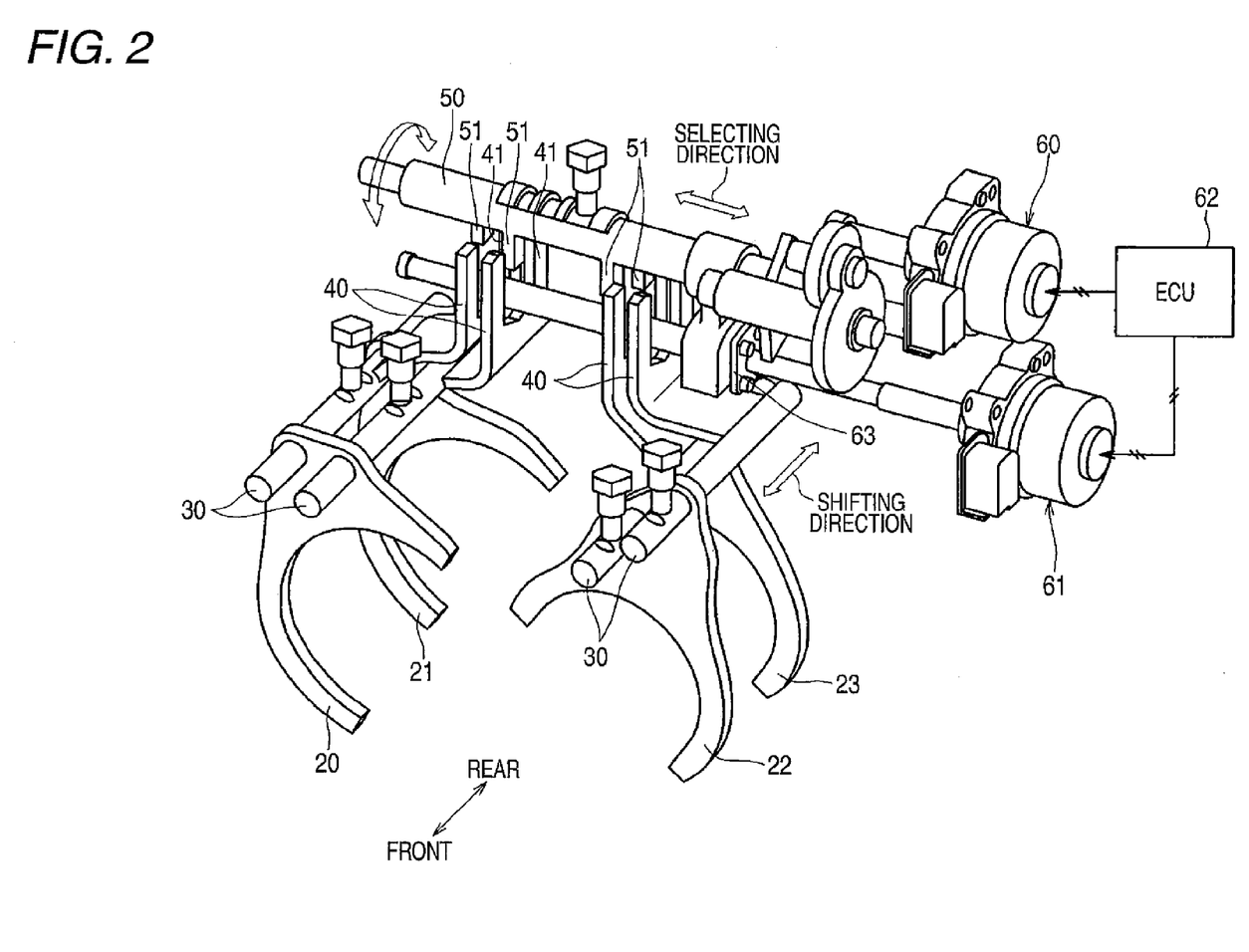
FIG. 2 is a perspective view showing the construction of an operating mechanism of shift forks.

FIG. 2 is a perspective view showing the construction of an operating mechanism of the shift forks 20 to 23.

As is shown in FIG. 2, the shift forks 20 to 23 are fixed, respectively, to four shift rails 30 which are disposed in such a manner as to move in a back and forth direction (a shifting direction), and furthermore, shift lugs 40 are provided on the shift rails 30, respectively. The shift lug 40 is a sheet material which is formed into a U-shape to open upwards and is disposed in such a manner that claw portions 41 provided at an upper end portion thereof align in the back and forth direction. The shift lugs 40 are disposed in such a manner that center lines of their openings in the back and forth direction align with one another in such a state that they are disengaged (or in neutral positions).

A shift shaft 50 is supported above the shift lugs 40 in such a manner as to extend over the back and forth direction center lines of the openings thereof so as to be rotated and moved in an axial direction (a selecting direction). Pawl-like control fingers 51 (shift members) are formed on the shift shaft 50 in such a manner as to project downwards therefrom. In addition, When the shift shaft 50 is slid in the axial direction so that the control finger 51 is positioned in the opening of the shift lug 40 for a target gear and the shift shaft 50 is then rotated to push the claw portion 41 of the shift lug 40 with the control finger 51, the shift forks 20 to 23 can be moved in the back and forth direction via the shift rails 30, so that the gears corresponding to the shift forks 20 to 23 can be engaged or disengaged for gearchange operations.

The shift shaft 50 is driven to rotate by a shifting motor 60 and is driven to slide in the axial direction by a selecting motor 61 via a ball screw 63. The shifting motor 60 and the selecting motor 61 are controlled to be driven by an ECU 62 based on the operation of a gearshift lever, not shown, and the running conditions of the engine 8 and are controlled to be driven in such a manner that gearchanges take place sequentially, for example, when a gearchange to a target gear is implemented. The ECU 62 also controls the operations of the clutches 2, 3 when gearchanges take place. Specifically, in changing gears, the ECU 62 controls the other clutch 3 or 2 to be engaged to engage the next gear from a state resulting before a gearchange has taken place in which one of the clutches 2 or 3 is engaged while maintaining the engagement of a gear which is engaged by the one of the clutches 2 or 3. Then, at a point in time at which the rotational speed of the gear that has just been engaged comes to synchronize with that of the previous gear, the latter gear is disengaged so as to realize a gearchange in which there is virtually no interruption of power flow as the gearchange takes place.

Figure 3:
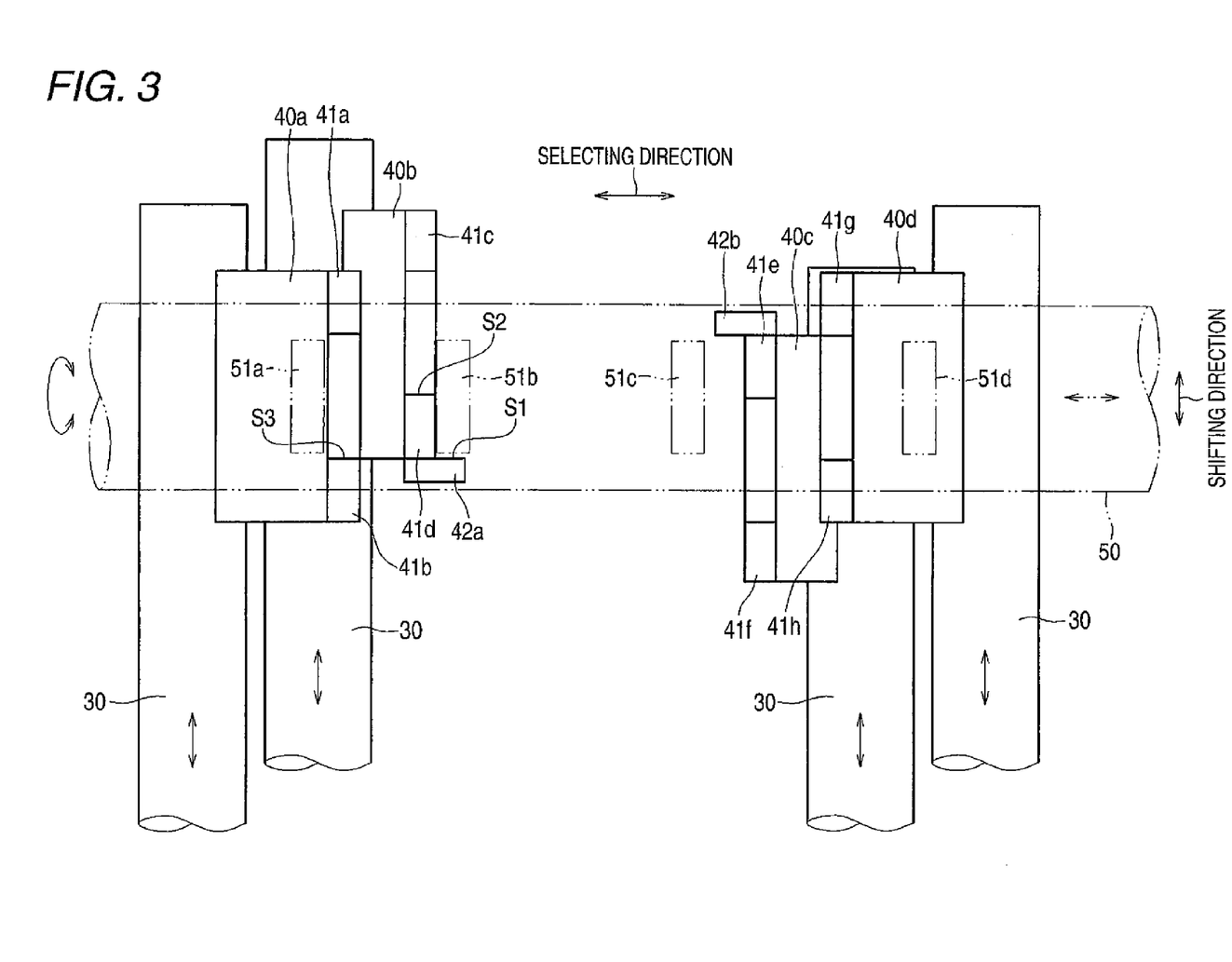
FIG. 3 is a plan view showing the configuration of a shift lug.

FIG. 3 is a plan view showing the configuration of the shift lug 40 (40a to 40d). In the figure a horizontal direction denotes the selecting direction, while a vertical direction denotes the shifting direction.

As is shown in FIG. 3, as the claw portions 41 of the shift lugs 40, a second speed gear claw portion 41a and a sixth speed gear claw portion 41b are provided on a first shift lug 40a, a third speed gear claw portion 41c and the first speed ear 41d are provided on a second shift lug 40b, a reverse gear claw portion 41e and a fourth speed gear claw portion 41f are provided on a third shift lug 40c, and a fifth speed gear claw portion 41g and a parking gear claw portion are provided on a fourth shift lug 40d In addition, as the control fingers 51 formed on the shift shaft 50, four control fingers 51 (51a to 51d) are provided on the shift shaft 50 in such a manner as to be spaced apart from each other in its axial direction, and they are, from the left in the figure, a first control finger 51a, which is adapted to move the first shift lug 40a, a second control finger 51b, which is adapted to move the second shift lug 40b, a third control finger 51b, which is adapted to move the third shift lug 40c, and a fourth control finger 51d, which is adapted to move the fourth shift lug 40d.

In this embodiment, disengagement claw portions (second claw portions) 42 (42a, 42b) are provided on some of the shift lugs 40, and specifically speaking, a left disengagement claw portion 42a is provided on the shift lug 40b, while a right disengagement claw portion 42b is provided on the third shift lug 40c. The left disengagement claw portion 42a is provided in such a manner as to project rightwards as viewed in the figure from a right side of the first speed gear claw portion 41d, whereby the left disengagement claw portion 42a functions to move the second shift lug 40b downwards in the figure when the control finger 51b which is being moved downwards along the first speed gear claw portion 41d is brought into abutment therewith. On the other hand, the right disengagement claw portion 42b is provided in such a manner as to project leftwards as viewed in the figure from a left side of the reverse gear claw portion 41e, whereby the right disengagement claw portion 42b functions to move the third shift lug 40c upwards in the figure when the control finger 51c which is being moved upwards along the reverse gear claw portion 41e is brought into abutment therewith. Namely, the second shift lug 40b and the third shift lug 40c are constructed so as to be moved in the respective shifting directions not only when their corresponding control fingers 51b, 51c which are being positioned in the openings between the claw portions 41 thereof are moved in the shifting direction so as to push the inner surfaces of the claw portions 41b but also when the control fingers 51b, 51c pushes on the corresponding disengagement claw portions 42a, 42b.

The left disengagement claw portion 42a is disposed such that an abutment portion S1 thereof, which constitutes a position where the second control finger 51b pushes on the left disengagement claw portion 42a, and an inner side surface S2 (a pressing portion) of the first gear claw portion 41d are offset from each other (displaced with each other) in the shifting direction, while the abutment portion S1 of the second shift lug 40b, which is in the shifting state, and an inner side surface of the other shift lug which is in the neutral state (for example, an inner side surface S3 of the sixth speed gear claw portion 41b in the figure) are placed on the same plane in the shifting direction (or are located in the same position with respect to the shifting direction). In addition, the right disengagement claw portion 42b has the same construction.

Figure 4:
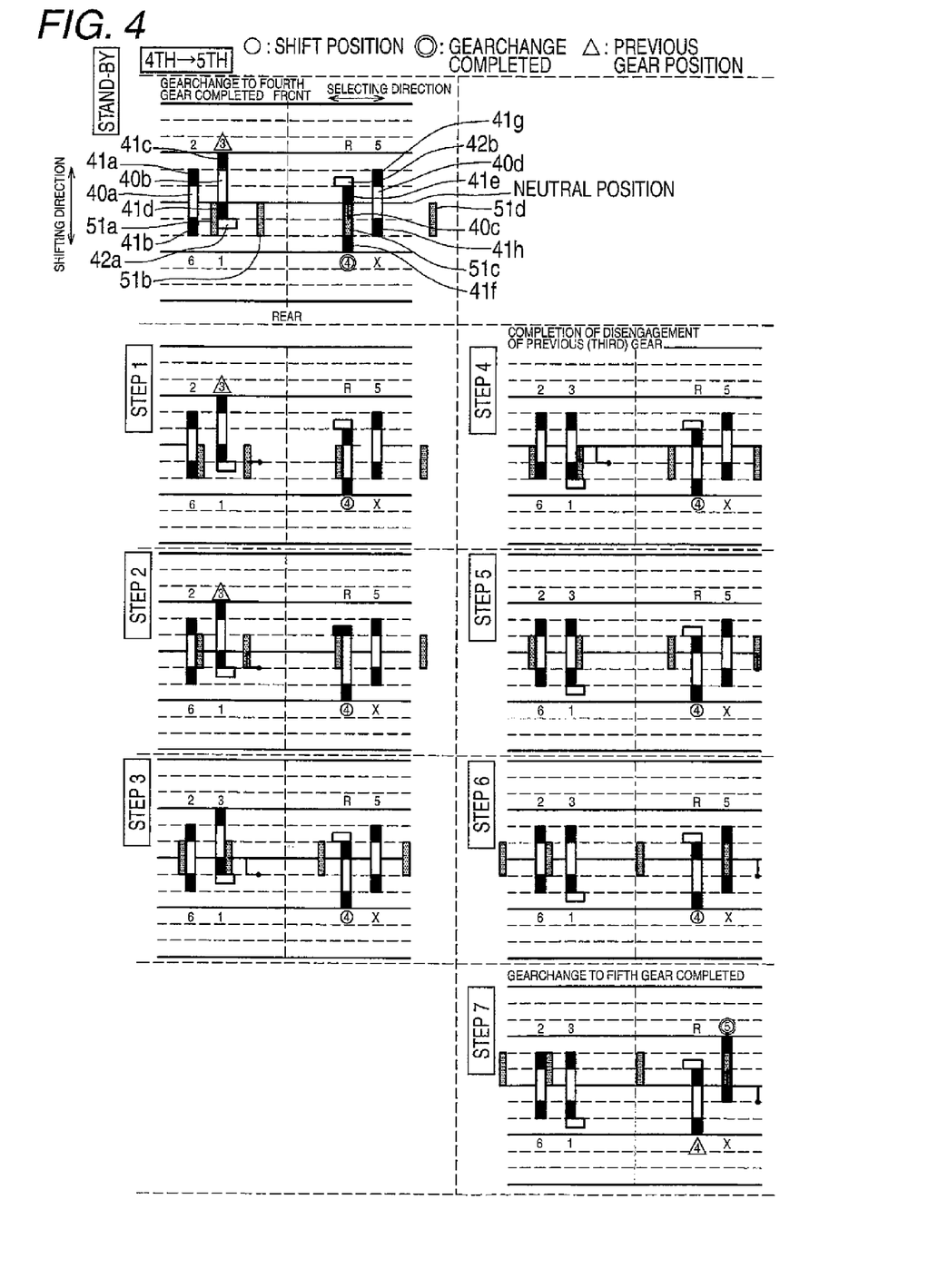
FIG. 4 is an explanatory diagram illustrating shifting of control fingers in changing gears according to an embodiment of the invention.

FIG. 4 is an explanatory diagram which illustrates shifting of the control fingers 51 according to the embodiment when a gearchange takes place. In this figure, as an example, shifting steps of the control fingers 51 are shown which take place from a state where the fourth speed gear has been engaged by disengaging the previous third speed gear to a state where the fifth speed gear is engaged.

In the figure, a vertical direction denotes the shifting direction and a horizontal direction denotes the selecting direction. A vertically central position denotes a neutral position. Each pair of claw portions 41a to 41h is made to be moved one scale vertically in the figure, and by being moved vertically outwards, a gearchange is made to the gear which corresponds to the claw portion so moved. In addition, the control fingers 51a to 51d are made to be moved one scale vertically from the vertical center in the figure when the shift shaft 50 is rotated.

(Stand-by state) This stand-by state is a state in which a gearchange to the fourth speed gear has just been completed. In the stand-by state, the third control finger 51c has pushed an inner side of the fourth speed gear claw portion 41f so as to move it outwards, whereby the fourth speed gear is engaged. In this state, the third speed gear claw portion 41c is also moved outwards.

(Step 1) The control fingers 51a to 51d are moved to leftwards as viewed in the figure, so that the first control finger 51a is brought into abutment with a right side of the sixth speed gear claw portion 41b.

(Step 2) The control fingers 51a to 51d are moved upwards to the neutral position in the figure.

(Step 3) The control fingers 51a to 51d are moved leftwards in the figure, so that the second control finger 51b is brought into abutment with a right side of the first speed gear claw portion 41d.

(Step 4) The control fingers 51a to 51d are moved downwards to the shift position in the figure, whereby the second control finger 51b pushes the left disengagement claw portion 42a so as to move it downwards. Consequently, the third speed gear claw portion 41c is moved to the neutral position, whereby the third speed gear is disengaged (completion of disengagement of the previous gear).

(Step 5) The control fingers 51a to 51d are moved upwards to the neutral position in the figure.

(Step 6) The control fingers 51a to 51d are moved leftwards in the figure, so that the fourth control finger 51d is moved to the same horizontal position as the fifth speed gear claw portion 41g.

(Step 7) The control fingers 51a to 51d are moved upwards in the figure, so that an inner side of the fifth speed gear claw portion 41g is pushed by the fourth control finger 51d so as to move the fifth speed gear claw portion 41g to the shift position, whereby a gearchange to the fifth speed gear is completed.

Thus, in the embodiment, the gearchange from the completion of engagement of the fourth speed gear to the completion of engagement of the fifth speed gear is completed through seven steps.

Next, shifting steps of control fingers 51 in a transmission unit according to the related art will be described as a comparison example.

Figure 5:
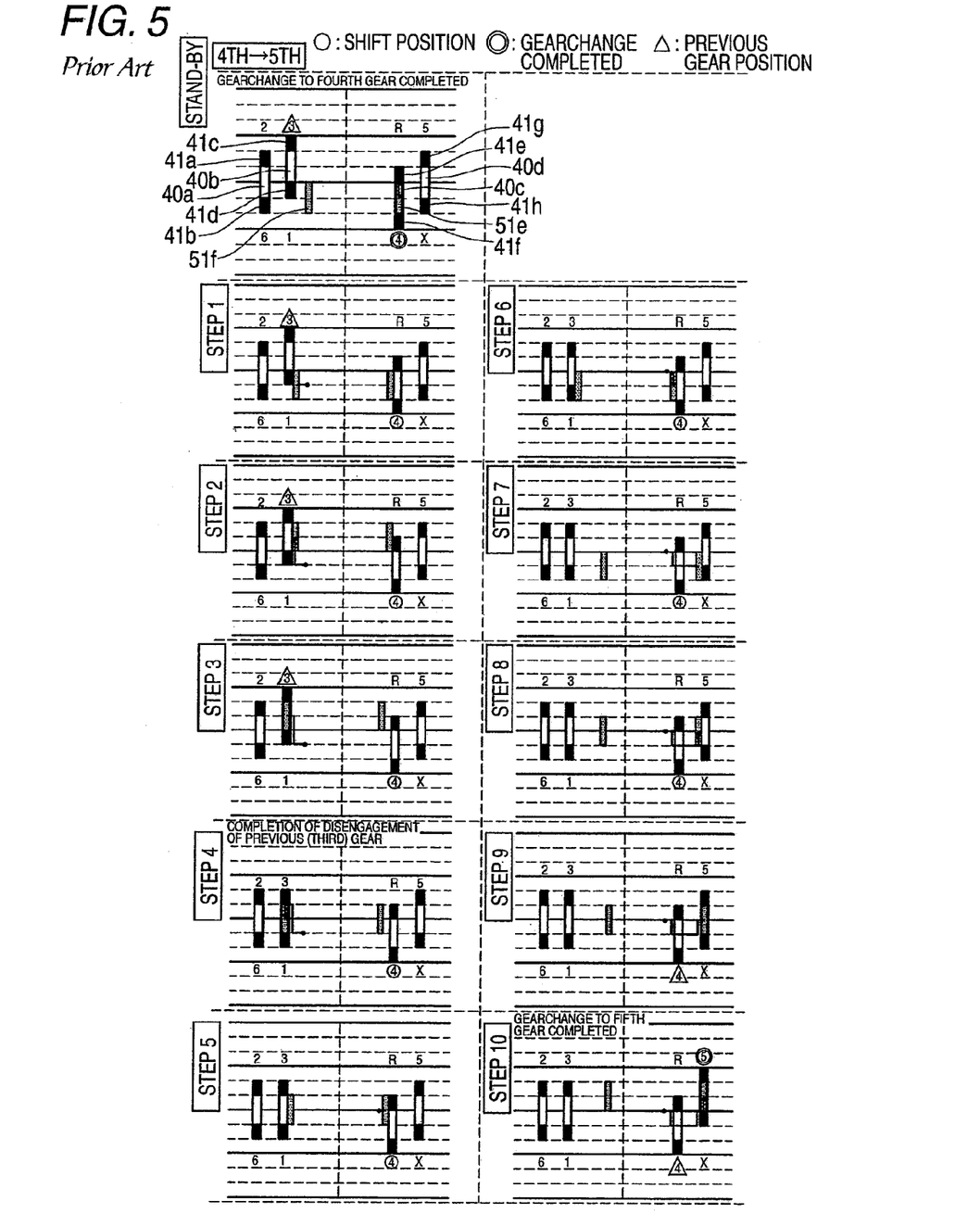
FIG. 5 is an explanatory diagram illustrating shifting of control fingers in changing gears according to a related art transmission.

FIG. 5 is an explanatory diagram which illustrates shifting of the control fingers 51 when a gearchange takes place in a first comparison example, and shifting steps of the control fingers 51 are shown from completion of a gearchange to the fourth speed gear by disengaging the previous third speed gear to completion of a gearchange to the fifth speed gear.

In the transmission unit of the first comparison example show in FIG. 5, when compared with the embodiment of the invention, the former differs from the latter in that the disengagement claw portions 42a, 42b are not provided. In addition, as control fingers 51, two control fingers, that is, a right-hand control finger 51*e* and a left-hand control finger 51*f*, are provided, and the right-hand control finger 51*e* is adapted to move a third shift lug 40*c* and a fourth shift lug 40*d*, while the left-hand control finger 51*f* is adapted to move a first shift lug 40*a* and a second shift lug 40*b*.

(Stand-by state) The right-hand control finger 51*a* has pushed an inner side of the fourth speed gear claw portion 41*f* so as to move it outwards, whereby the fourth speed gear is engaged. In this state, the third speed gear claw portion 41*c* is also moved outwards.

(Step 1) The control fingers 51*e*, 51*f* are moved leftwards in the figure, so that the left-hand control finger 51*e* is brought into abutment with a right side of the first speed gear claw portion 41*d*.

(Step 2) The control fingers 51*e*, 51*f* are moved to an upper shift position in the figure.

(Step 3) The control fingers 51*e*, 51*f* are moved leftwards in the figure, so that the left-hand control finger 51*e* is moved to the same horizontal position as the first speed gear claw portion 41*d*.

(Step 4) The control fingers 51*e*, 51*f* are moved downwards to the neutral position in the figure, whereby the left-hand control finger 51*f* pushes an inner side of the first speed gear claw portion 41*d* so as to move it downwards. Consequently, the third speed gear claw portion 41*c* is moved to the neutral position, whereby the third speed gear is disengaged (completion of disengagement of the previous gear).

(Step 5) The control fingers 51*e*, 51*f* are moved rightwards in the figure, so that the right-hand control finger 51*e* is brought into abutment with a left side of the reverse gear claw portion 41*e*.

(Step 6) The control fingers 51*e*, 51*f* are moved downwards in the figure so as to be moved to a lower shift position in the figure.

(Step 7) The control fingers 51*e*, 51*f* are moved rightwards in the figure, so that the right-hand control finger 51*e* is brought into abutment with a left side of the parking gear claw portion 41*h*.

(Step 8) The control fingers 51*e*, 51*f* are moved upwards to the neutral position in the figure.

(Step 9) The control fingers 51*e*, 51*f* are moved rightwards in the figure, so that the right-hand control finger 51*e* is moved to the same horizontal position as the fifth speed gear claw portion 41*g*.

(Step 10) The control fingers 51*e*, 51*f* are moved upwards in the figure, so that the right-hand control finger 51*e* pushes an inner side of the fifth speed gear claw portion 41*g* so as to move the fifth speed gear claw portion 41*g* to the shift position, whereby the gearchange to the fifth speed gear is completed.

As has been described heretofore, in the transmission unit of the first comparison example, ten steps are required from the completion of gearchange to the fourth speed gear to the completion of gearchange to the fifth speed gear.

Next, shifting steps of control fingers 51 in another transmission unit according to the related art will be described as a second comparison example.

Figure 6:
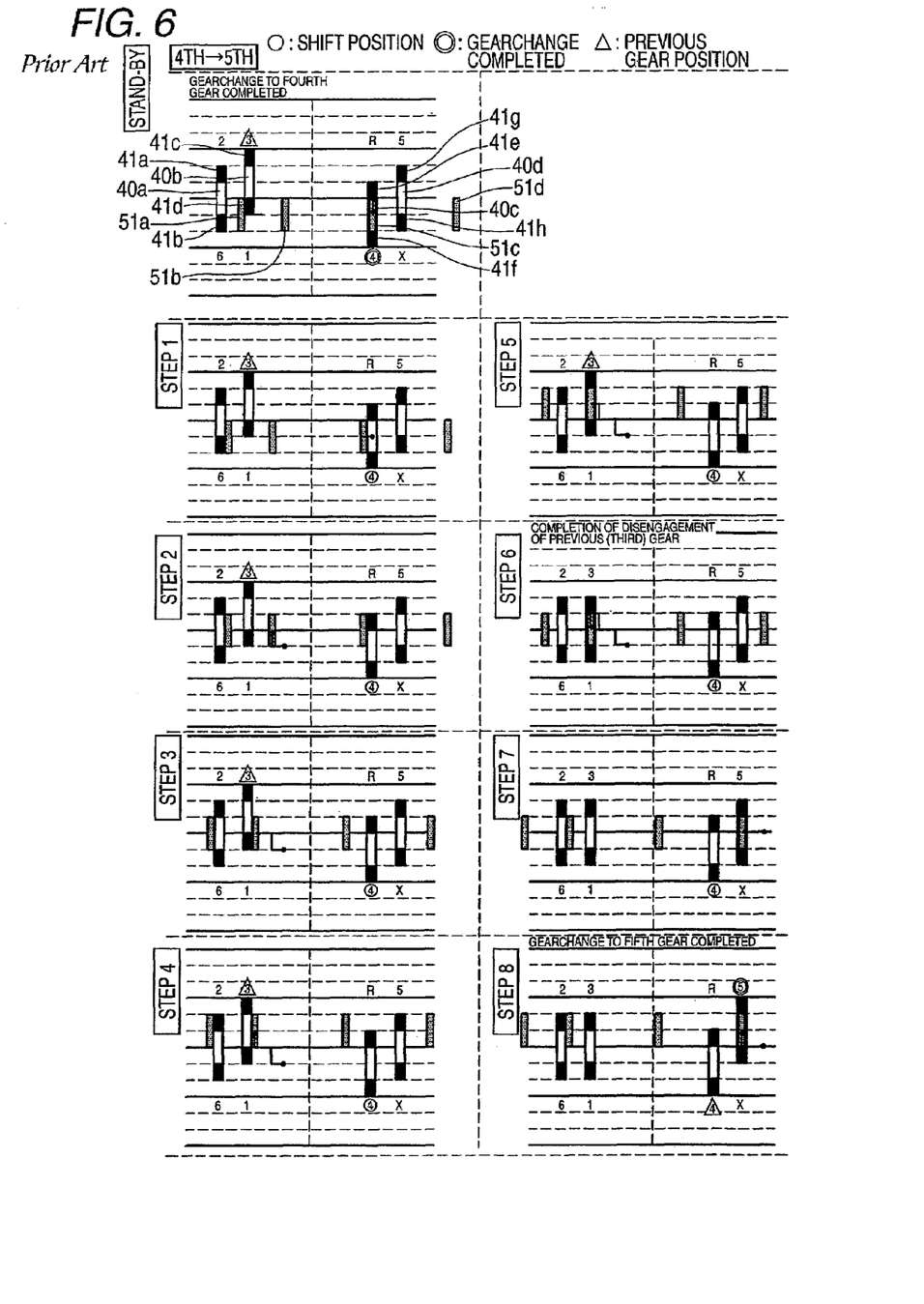
FIG. 6 is an explanatory diagram illustrating shifting of control fingers in changing gears according to another related art transmission.

FIG. 6 is an explanatory diagram which illustrates shifting of the control fingers 51 when a gearchange takes place in the second comparison example, and shifting steps of the control fingers 51 are shown from completion of a gearchange to the fourth speed gear by disengaging the previous third speed gear to completion of a gearchange to the fifth speed gear.

In the transmission unit of the second comparison example show in FIG. 6, when compared with the embodiment of the invention, the former differs from the latter in that the disengagement claw portions 42*a*, 42*b* are not provided. On the other hand, the former is constructed the same as the latter in that four control fingers are provided.

(Stand-by state) The right-hand control finger 51*c* has pushed an inner side of the fourth speed gear claw portion 41*f* so as to move it outwards, whereby the fourth speed gear is engaged. In this state, the third speed gear claw portion 41*c* is also moved outwards.

(Step 1) The control fingers 51*a* to 51*d* are moved leftwards in the figure, so that the first control finger 51*a* is brought into abutment with a right side of the sixth speed gear claw portion 41*b*.

(Step 2) The control fingers 51*a* to 51*d* are moved to the neutral position.

(Step 3) The control fingers 51*a* to 51*d* are moved leftwards in the figure, so that the second control finger 51 is brought into abutment with a right side of the first speed gear claw portion 41*d*.

(Step 4) The control fingers 51*a* to 51*d* are moved to an upper shift position in the figure.

(Step 5) The control fingers 51*a* to 51*d* are moved leftwards in the figure, so that the second control finger 51*b* is moved to the same horizontal position as the first speed gear claw portion 41*d*.

(Step 6) The control fingers 51*a* to 51*d* are moved downwards to the neutral position in the figure, whereby the second control finger 51*b* pushes the inner side of the first speed gear claw portion 41*d* so as to move it downwards. Consequently, the third speed gear claw portion 41*c* is moved to the neutral position, whereby the third speed gear is disengaged (completion of disengagement of the previous gear).

(Step 7) The control fingers 51*a* to 51*h* are moved leftwards in the figure, so that the fourth control finger 51*d* is moved to the same horizontal position as the fifth speed gear claw portion 41*g*.

(Step 8) The control fingers 51*a* to 51*d* are moved upwards in the figure, so that the fourth control finger 51*d* pushes an inner side of the fifth speed gear claw portion 41*g*, so as to move the fifth speed gear claw portion 41*g* to the shift position, whereby the gearchange to the fifth speed gear is completed.

As has been described heretofore, in the transmission unit of the second comparison example, eight steps are required from the completion of gearchange to the fourth speed gear to the completion of gearchange to the fifth speed gear.

In the embodiment of the invention, since the disengagement claw portions 42 are provided on the shift lugs 40, the shift lugs 40 can be moved not only by positioning the control fingers in the openings of the claw portions 41 and then shifting the control fingers 51 in the shifting direction but also by causing the control fingers 51 to push on the disengagement claw portions 42 which project in the selecting direction from the claw portions 41 in the shifting direction. Consequently, a plurality of shifting paths for disengagement operations can be set, thereby making it possible to decrease the number of shifting steps of the control fingers 51 when a gearchange takes place.

In particular, in this embodiment, since the pressing portion S2 of the first speed gear claw portion 41*d* and the abutment portion S1 of the left disengagement claw portion 42*a* are offset from each other in the shifting direction, while the abutment portions S1 of the second shift lug 41*b* which is in the shifting state and the pressing portion S3 of the other shift lug 40*a* which is in the neutral position are positioned on the same plane with respect to the shifting direction, when placing the second shift lug 40*b* which is in the shifting state in the neutral state, by shifting the second control finger 51*b*, which is in the neutral position, in such a manner as to approach in the selecting direction from the projecting side of the left disengagement claw portion 42*a*, the second control finger 51*b* can be moved to the abutment portion S1 without interference with the first speed gear claw portion 41*d*, and as the following step, shifting of the second control finger 51*b* in the shifting direction can be minimized. Consequently, a gearchange can be attained in which the second shift fork 21 can be moved from the shifting state to the neutral state quickly and efficiently. Note that this advantage can similarly be obtained with respect to the third shift fork 22 which connects to the third shift lug 40*c* which includes the right disengagement claw portion 42*b*.

In addition, since the shifting path of the control fingers 51 can be selected from the plurality of shifting paths, even though the number of control fingers 51 is increased, the shifting path still can be set so as to suppress the occurrence of unnecessary interference between the control fingers 51 and the claw portions 41. Consequently, by combining the provision of the disengagement claw portions 42 and the increase in the number of control fingers 51, the number of shifting steps of the control fingers 51 can largely reduced when a gearchange takes place.

In this way, in the embodiment, since the number of shifting steps of the control fingers 51 can be reduced largely when a gearchange takes place, a reduction in shift time can be realized. In addition, also in changing gears to the other speed gears, the number of shifting steps of the control fingers 51 can be reduced.

In addition, in the embodiment, since the necessity is obviated of expanding largely the space between the pair of claw portions of the shift lug 40 relative to the control finger 51 as has taken place in the related art transmission unit described in JP-A-2001-304411, once it is moved, the control finger 51 can be brought into abutment with the claw portion 41 immediately, thereby making it possible to enable a quick gearchange.

Figure 7:
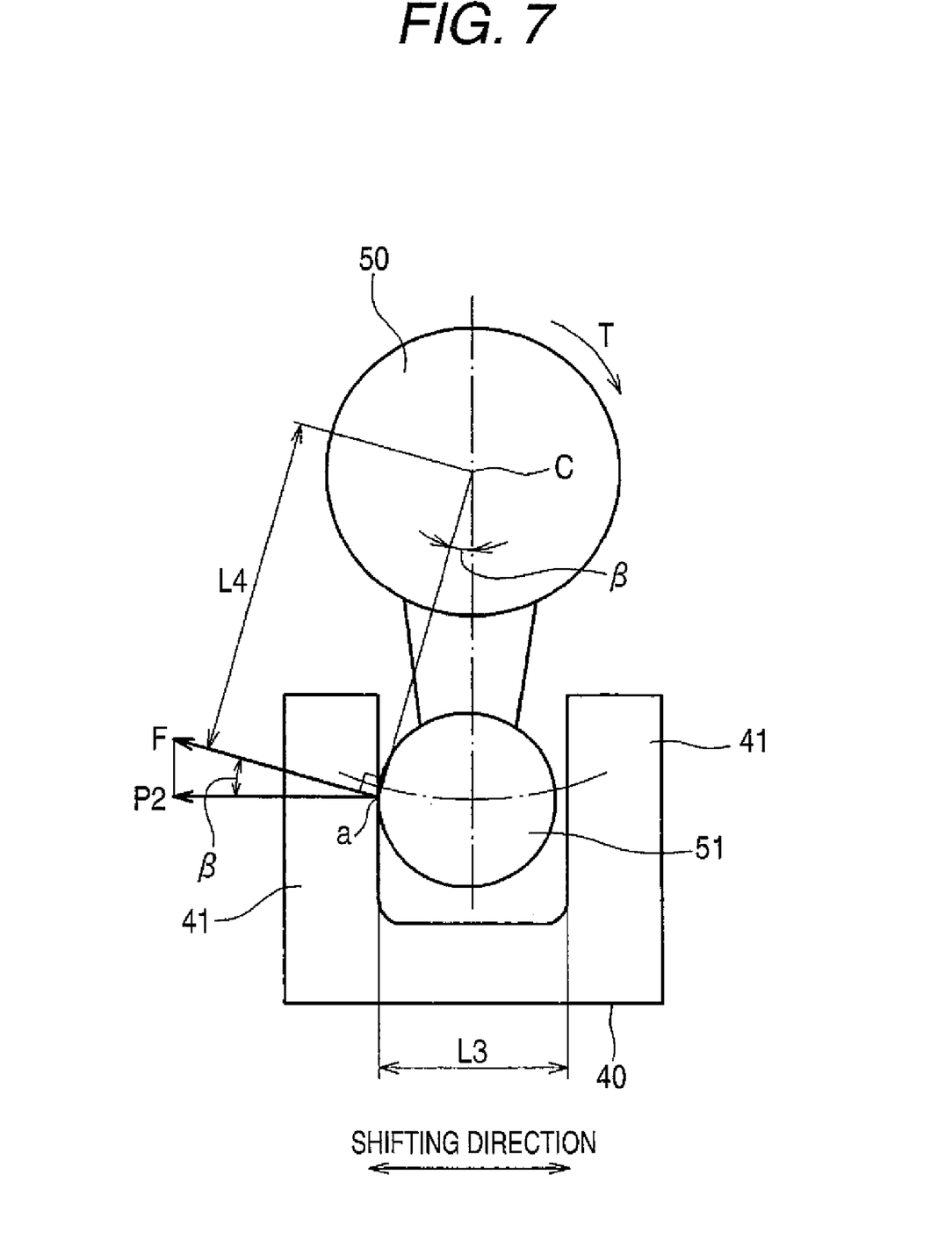
FIG. 7 is a schematic diagram showing the construction of a shifting mechanism of the shift lug according to the embodiment.

FIG. 7 is a schematic diagram showing the construction of the shifting mechanism of the shift lug according to the embodiment.

In this embodiment, since the space L3 between the pair of claw portions 41 can be set relatively narrow, the control finger 51 is allowed to push the claw portion 41 while it is tilted little in the shifting direction. Assuming that a force exerted on the claw portion 41 by a rotational torque T of the shift shaft 50 then is a tangential force F, a distance from a contact point a between the control finger 51 and the claw portion 41 to an axial center C of the shift shaft 50 is a distance L4, and a tilt angle of a line which connects the contact point a with the axial center C of the shift shaft 50 towards the shifting direction is an angle β, a component of the tangential force F in the shifting direction, that is, a component force P2 which is a force which shifts the claw portion 41 in the shifting direction is obtained by the following equation (2).

$$P2 = F \times \cos\beta = T \times \cos\beta / L4 \quad (2)$$

Consequently, in this embodiment, since the space L3 between the pair of claw portions 41 is relatively narrow and hence the angle β is suppressed to a smaller angle, as is expressed by the equation (2), the component force 2 is reduced largely relative to the tangential force F in no case. In addition, since the distance L4 remains substantially constant irrespective of the angle β, the rotational torque T of the shift shaft 50 is transmitted with good efficiency as a force which pushes the claw portion 41 in the shifting direction, thereby making it possible to move the shift lug 40 in the shifting direction with good efficiency.

In addition, since the control fingers 51 are provided more than one, even in the event that there are many gears to be changed, each control finger 51 is made to operate some of the shift lugs for gearchanges, whereby the shifting distance of each control finger in the shifting direction can be suppressed to a shorter distance. Consequently, the shifting mechanism of the control fingers 51 can be made compact in size with respect to the shifting direction.

In addition, the positions and number of disengagement claw portions 42 may be set appropriately depending upon the number and arrangement of gears. Additionally, the invention can be applied to a transmission unit with a different number of gears from the embodiment, and the number of control fingers 51 may be set appropriately depending upon the number of gears to be provided.

According to an aspect of the invention, the shift lug can be moved in the shifting direction when the shift member which is being moved in the shifting direction is brought into abutment with the second claw portion to thereby push it in the shifting direction. Consequently, when shifting the shift lug, since the shift lug can be moved by the shift member being moved in the shifting direction not only in the position of the first claw portion in the selecting direction but also in the position of the second claw portion in the selecting direction, the range of selection of shifting paths of the shift member is increased, and it can be set such that the movements of the shift member are simplified during gearchanges. In this way, since the movements of the shift member during gearchanges can be simplified without expanding widely the space of the pair of first claw portions, the shift forks can be operated from the neutral state to the shifting state quickly and efficiently, and this enables gearchanges in which the shift forks can be operated from the neutral state to the shifting state quickly and efficiently.

According to an aspect of the invention, when shifting the shift member in the selecting direction, the shift member can be placed to the second claw portion without interference with the first claw portion, and this enables gearchanges in which the shift forks can be operated from the neutral state to the shifting state quickly and efficiently.

According to an aspect of the invention, when shifting the shift member in the selecting direction, not only can the shift member be placed to the second claw portion without interference with the first claw portion, but also shifting of the shift member in the shifting direction can be minimized, and this enables gearchanges in which the shift forks can be operated from the neutral state to the shifting state quickly and efficiently.

According to an aspect of the invention, the shift member can be moved in the shifting direction and the selecting direction by rotating and shifting the shaft in the selecting direction by the actuator. Consequently, the shifting mechanism for shifting the shift member in the shifting direction and the selecting direction can be realized with the simple configuration.

According to an aspect of the invention, since the shift member is provided more than one on the shaft in such a manner as to be spaced apart from each other in the selecting direction, even in the event that there are many gears to be changed and hence so many shift rails are required, each shift member can be set to operate some or others of the shift rails for gearchanges, whereby the shifting of each shift member in the selecting direction can be reduced. Consequently, the shifting mechanism of the shift members can be made compact in size with respect to the selecting direction.

What is claimed is:

1. A transmission provided with a dual-clutch-type transmission mechanism comprising:

a plurality of shift members which are adapted to be moved in a shifting direction and a selecting direction;

a plurality of shift lugs each of which has a pair of first claw portions spaced apart from each other in the shifting direction and which are arranged in the selecting direction; and a shift fork which is connected to one of the shift lugs via a shift rail and performs a corresponding gear shift operation, wherein the shift members are moved by an actuator so that one of the shift members pushes one of the pair of first claw portions of one of the shift lugs in one shifting direction by inserting the one of the shift members into a space between the pair of first claw portions to thereby selectively move the one of the shift lugs in the one shifting direction so as to cause the shift fork to move from a neutral position to a shift position, wherein while a first one of the shift lugs is held at the shift position, a shift operation of a second one of the shift lugs is performed, and wherein a second claw portion is provided in such a manner as to project from the pair of first claw portions in the selecting direction so that, in the shift position, the second claw portion accommodates a displacement of the one of the shift members in the selecting direction, and the second claw portion is brought into abutment with the one of the shift members in association with a displacement of the one of the shift members from the displacement accommodated state in the shifting direction so as to cause the shift fork to move from the shift position to the neutral position by moving the first one of the shift lugs in a direction opposite to the one shifting direction without inserting the one of the shift members into the space between the pair of first claw portions.

2. The transmission as set forth in claim 1, wherein a pressing portion via which the one of the shift members pushes one of the pair of first claw portions is provided on the first one of the shift lugs, and an abutment portion via which the one of the shift members is brought into abutment with the second claw portion is provided on the first one of the shift lugs, and the pressing portion and the abutment portion are offset from each other in the shifting direction.

3. The transmission as set forth in claim 2, wherein a pressing portion provided on a second one of the shift lugs different from the first one of the shift lugs which is in the neutral position and the abutment portion provided on the first one of the shift lugs which is in the shift position are disposed on the same plane with respect to the shifting direction.

4. The transmission as set forth in claim 1, wherein the transmission further includes a shaft which has an axis extended in the selecting direction and is adapted to be moved in the selecting direction and is rotated by the actuator, and the shift members project from an outer circumference of the shaft so as to form a pawl shape.

5. The transmission as set forth in claim 1, wherein the plurality of shift members are provided on a shaft and are spaced apart from each other in the selecting direction.

6. The transmission as set forth in claims 4 or 5, wherein the axis of the shaft is arranged on an approximately straight line extending in an extending direction of the pair of first claw portions from a center position in the shifting direction in the space between the pair of first claw portions at the neutral position of one of the shift lugs.

7. The transmission as set forth in claim 1, wherein in a width of the one of the shift members in the shifting direction and the space between the pair of first claw portions in the shifting direction are substantially equal.

* * * * *